Figure 3:
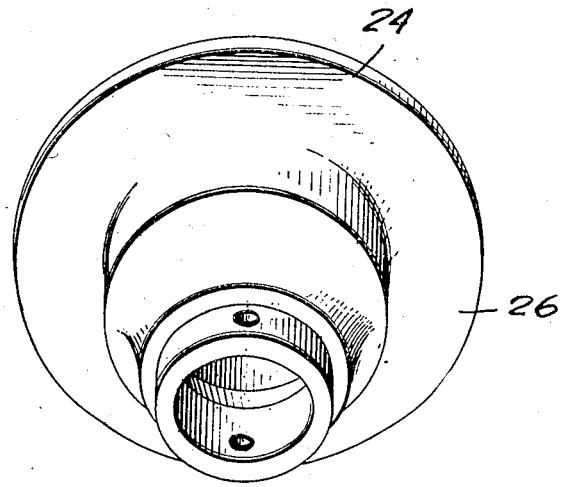

J. H. SYMONDS.
MOTOR CAR WHEEL.
APPLICATION FILED JUNE 4, 1907.
913,580.
Patented Feb. 23, 1909.
3 SHEETS—SHEET 1.
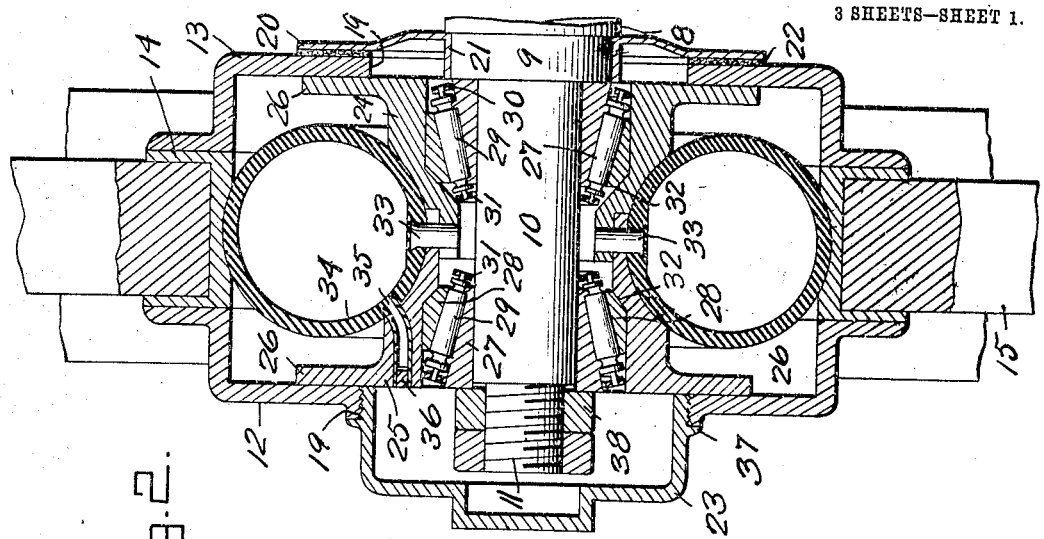
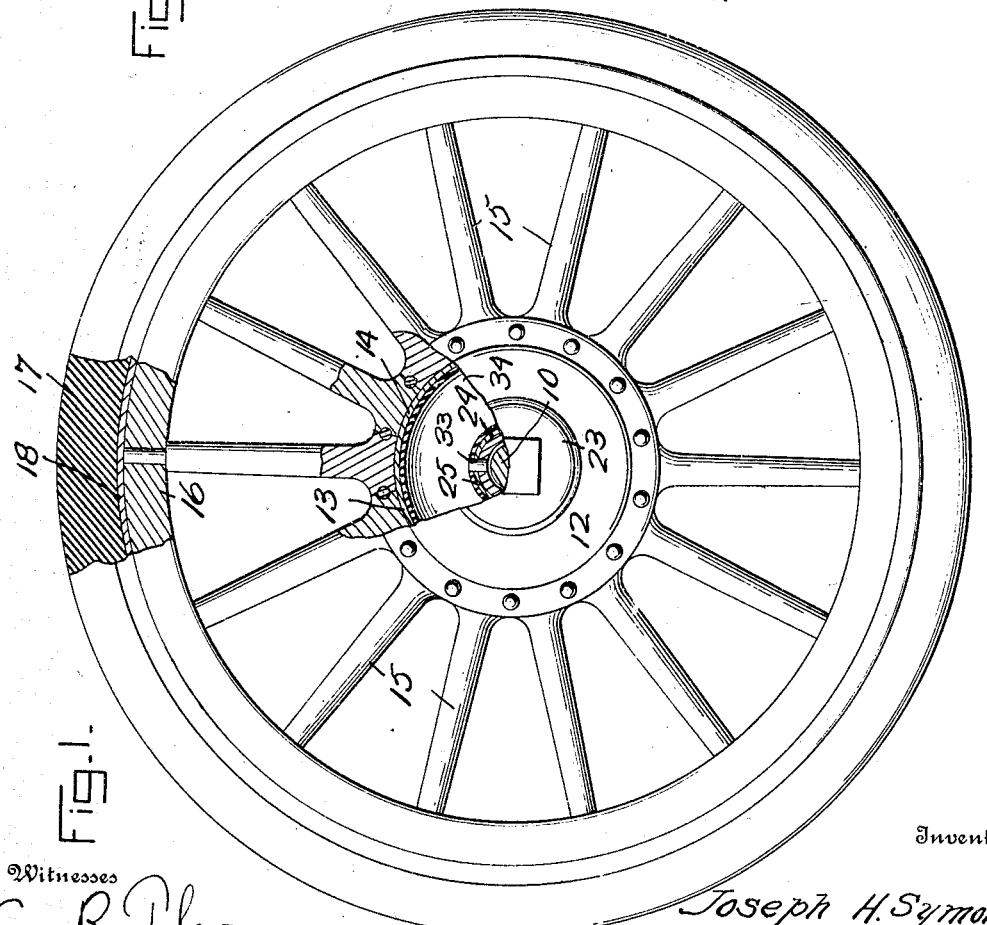
Witnesses
G. R. Thomas
Inventor
Joseph H. Symonds
Chandler & Chandler
Attorneys

J. H. SYMONDS.
MOTOR CAR WHEEL.
APPLICATION FILED JUNE 4, 1907.

913,580.

Patented Feb. 23, 1909.
3 SHEETS—SHEET 2.

Witnesses
G. R. Thomas
H. C. McCarteney

Inventor
Joseph H. Symonds
By Chandler & Chandlee
Attorneys

J. H. SYMONDS.
MOTOR CAR WHEEL.
APPLICATION FILED JUNE 4, 1907.
913,580.
Patented Feb. 23, 1909.
3 SHEETS—SHEET 3.
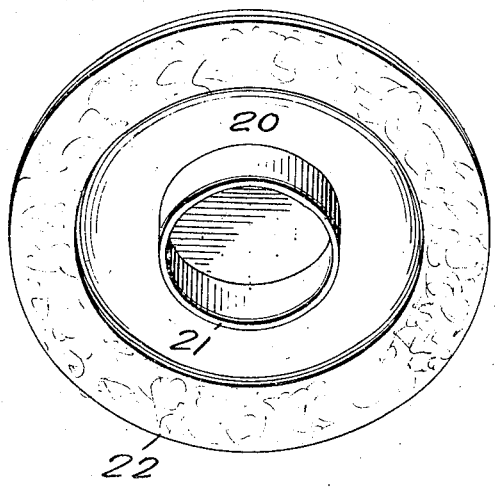
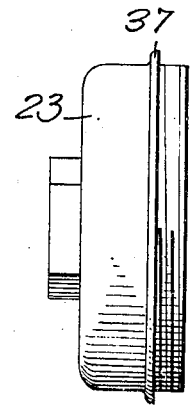
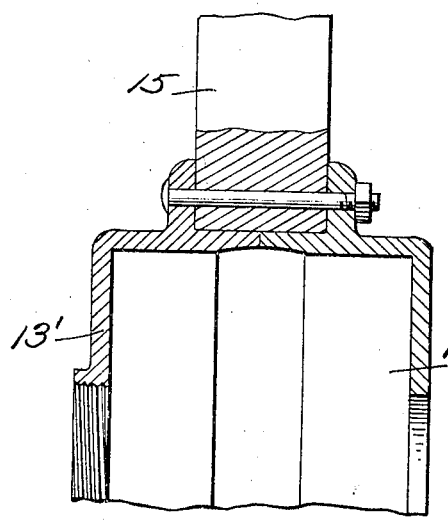
Witnesses
G. R. Thomas
F. C. McCartney
Inventor
Joseph H. Symonds
By Chandler & Chandler
Attorneys

UNITED STATES PATENT OFFICE.

JOSEPH H. SYMONDS, OF SWAMPSCOTT, MASSACHUSETTS.

MOTOR-CAR WHEEL.

No. 913,580. Specification of Letters Patent. Patented Feb. 23, 1909.

Application filed June 4, 1907. Serial No. 377,254.

*To all whom it may concern:*

Be it known that I, JOSEPH H. SYMONDS, a citizen of the United States, residing at Swampscott, in the county of Essex, State of Massachusetts, have invented certain new and useful Improvements in Motor-Car Wheels; and I do hereby declare the following to be a full, clear, and exact description of the invention, such as will enable others skilled in the art to which it appertains to make and use the same.

The present invention has reference to wheels designed for motor vehicles, and it aims to provide a strong, durable, and efficient resilient wheel in which the pneumatic cushion is completely protected against accidental deflation from puncture or otherwise by the casing of the wheel hub.

The invention further aims to provide means for preventing any accidental displacement of the cushion within the casing; for retaining the internal bearings of the axle in place within the hub casing; for decreasing the frictional wear upon said bearings; and for preventing the entry of dust or grit into the casing.

With the above and other ends in view, the invention consists in the construction, combination, and arrangement of parts, all as hereinafter fully described, specifically claimed, and illustrated in the accompanying drawings in which like parts are designated by corresponding reference numerals in the several views.

Figure 4:
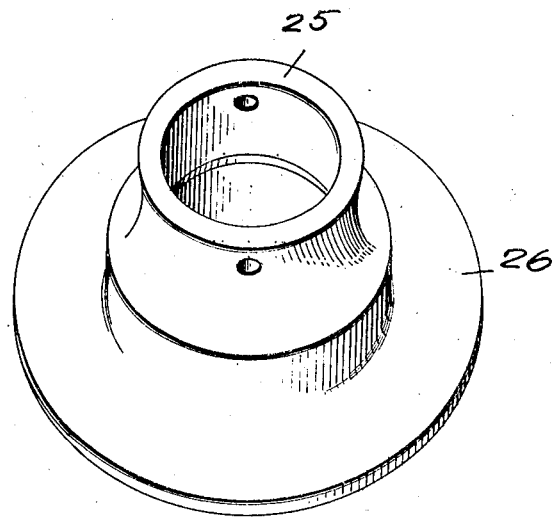

Of the said drawings, Figure 1 is a front elevation, partly in section, of a wheel constructed in accordance with the present invention, Fig. 2 is an enlarged axial section therethrough, Fig. 3 is an enlarged perspective view of one of the members of the internal bearing, Fig. 4 is a similar view of the other bearing member, Fig. 5 is a detail view of the dust cap, Fig. 6 is an inverted perspective view of the dust guard, showing the inwardly projecting flange formed thereon, and also the felt washer, Fig. 7 is an axial section through a modified form of casing.

Referring more particularly to the drawings the numeral 8 indicates the axle of the wheel upon the ends of which the steps 9, 10, and 11 are formed, the steps being of gradually decreasing diameter, as shown. Mounted upon said stepped end is the hub casing which, in the preferred construction, consists of outer and inner plates, 12 and 13, between which the trough-shaped spoke rim 14 is fitted, the inner ends of the spokes 15 being disposed in said rim, while their reduced upper ends fit in openings formed in the felly 16 to which the cushion tire 17 and its clamping plate 18 are secured. Each of the casing plates is provided with an axial opening 19, the opening in the inner or rear plate being closed by the dust-guard 20 which is in turn provided with an inwardly-projecting tubular sleeve or flange 21 which is formed integral therewith and fits upon the innermost step 9 of the axle. The dust-guard is further provided with an annular washer 22 of felt or similar material, which is secured to its inner face and bears directly against the outer face of plate 13 adjacent the opening therein above referred to. The opening in the opposite, or front plate 12, is closed by a cup-shaped dust-cap 23 hereinafter more fully described.

Disposed completely within the hub casing is an internal bearing for the axle, which bearing consists of an inner member 24 and an outer member 25, each member having a plane, circumscribing flange or extension 26 which bears against the inner face of the adjacent plate, as shown in Fig. 2. These bearing members are so disposed as to embrace the central step 10 of the axle and are each provided with an axial opening through which the axle passes, the diameter of said openings being somewhat greater than that of the axle step 10, to admit of the interposition of the pairs of inner and outer races 27 and 28, between which the angularly-disposed anti-friction rollers 29 are fitted, the opposite end of each series of rollers being engaged in perforated spacing-rings 30 and 31. The mutually adjacent inner ends of the bearing members overlap each other, as shown in Fig. 2, the inner member 24 having such end undercut to form a seat adapted to receive the adjacent end of the outer member; in addition, each of said members is slightly offset, or directed inwards towards the axle, these offset portions 32 serving as steps to prevent the pairs of races from moving towards each other.

The overlapping ends of the bearing members are provided with a series of registering perforations adapted to receive the projecting ends of a series of pins 33 which project radially from the inner periphery of a pneumatic tire 34, the heads of the pins being embedded in the rubber of which the tire is formed during its molding and prior to its vulcanization. Owing to this construction, it will be apparent that the tire will be positively held in place within the casing, and its accidental displacement prevented. The tire thus rests upon the bearing members directly above the offset portions 32 thereof, the outer faces of said members being slightly concaved, as shown. The tire is inflated by means of a tube 35 which extends through an opening 36 formed in the bearing member 25, access to the tube being had through the opening 19 in the plate 12.

The dust-cap 23 which closes the opening just referred to is cup-shaped, as shown, and its threaded inner end is engaged with the threaded wall which surrounds said opening and is somewhat widened, or flared, the outer face of the cap having a peripheral shoulder 37 which abuts against said wall thus limiting the movement of the cap. The nuts 38, which are secured onto the threaded outer step 11 of the axle, are completely incased by the cup, said nuts preventing bodily movement of the hub in one direction and also preventing displacement of the outer pair of races; movement of the hub in the opposite direction is prevented by the formation of the step 9.

It will be apparent from the foregoing, therefore, that when the several parts of the wheel have been assembled and are in the position shown in Fig. 2, the wheel will be yieldingly supported upon the axle, and will be capable of movement relatively thereto, owing to the resilient cushion formed by the inflated tire. It will likewise be apparent that the complete inclosure of the cushion obviates all danger of puncture, while its pin engagement with the bearing members renders its accidental displacement impossible. The bearing members themselves are held against displacement by the pin engagement above referred to and by the casing plate 13 and nuts 38.

While the casing is preferably formed of three separate parts, i. e., the plates 12 and 13 and the spoke-rim or channel 14, it will be obvious that such construction is not an essential of the invention, as the casing may be formed in two mating parts 13' and 14' which are bolted together, as shown in Fig. 7.

What is claimed, is,

1. The combination, in a wheel, of a central hub casing; a pair of oppositely-disposed axle-bearings located within the casing and having their mutually-adjacent ends overlapped, said overlapping ends having registering perforations formed therethrough; a pneumatic cushion inclosed by said casing and surrounding said bearings; and a series of pins carried by said cushion and positively engaged in said perforations, for preventing displacement of said cushion.

2. The combination, in a wheel, of a central hub casing; a pair of oppositely-disposed axle-bearings located therewithin and having their mutually-adjacent ends overlapped; an annular pneumatic cushion inclosed by said casing and surrounding said bearings; and a series of pins projecting radially from the inner periphery of said cushion, and positively engaged with said overlapping bearing-ends, to prevent displacement of said cushion, said pins being embedded in the material of which said cushion is formed during the process of manufacture of the cushion.

3. The combination, in a wheel, of a central hub casing including side plates, provided with alining openings; an axle projecting through said openings; a pair of oppositely disposed axle bearings arranged in spaced relation to the surface of the axle; a pair of oppositely disposed series of anti-friction rollers disposed between said bearings and the axle; means formed upon said bearings for preventing movement of one series of rollers towards the other; and an annular pneumatic cushion disposed within the casing and surrounding said bearings.

In testimony whereof, I affix my signature, in presence of two witnesses.

JOSEPH H. SYMONDS.

Witnesses:
G. M. POLAND,
LORING P. JORDAN.